United States Patent [19]

Heise et al.

[11] Patent Number: 5,296,544
[45] Date of Patent: Mar. 22, 1994

[54] POLYESTER-POLYURETHANE HYBRID RESIN SYSTEMS CONTAINING LOW LEVELS OF UNSATURATION HAVING IMPROVED LOW PROFILING BEHAVIOR

[75] Inventors: Michael S. Heise, Naperville; Janet L. Zuffa, Elmhurst, both of Ill.

[73] Assignee: Cook Composites and Polymers, Port Washington, Wis.

[21] Appl. No.: 913,297

[22] Filed: Jul. 14, 1992

[51] Int. Cl.$^5$ .................. C08L 67/06; C08L 75/04
[52] U.S. Cl. ........................ 525/28; 525/35; 525/36; 525/440; 525/445
[58] Field of Search ............... 525/28, 440, 445

[56] References Cited

U.S. PATENT DOCUMENTS

| | | | |
|---|---|---|---|
| 4,280,979 | 7/1981 | Dunleavy et al. | 264/157 |
| 4,296,020 | 10/1981 | Magrans, Jr. | 260/37 N |
| 4,316,835 | 2/1982 | Gardner | 260/40 R |
| 4,361,623 | 11/1982 | Newkirk et al. | 428/394 |
| 4,396,729 | 8/1983 | Dominquez et al. | 521/51 |
| 4,433,067 | 2/1984 | Rice et al. | 521/51 |
| 4,584,325 | 4/1986 | Smith | 521/99 |
| 4,822,849 | 4/1989 | Vanderlaan | 525/17 |
| 4,868,231 | 9/1989 | Lenke et al. | 523/512 |
| 4,880,872 | 11/1989 | Thomas | 525/43 |
| 4,943,607 | 7/1990 | Tanisake et al. | 523/500 |
| 4,994,543 | 2/1991 | Nakane et al. | 528/83 |
| 5,047,455 | 9/1991 | Hesse et al. | 523/508 |
| 5,153,261 | 10/1992 | Brooks | 525/28 |
| 5,159,044 | 10/1992 | Bogner | 528/75 |

FOREIGN PATENT DOCUMENTS 2301691 1/1973 Fed. Rep. of Germany ......... C07C 69/34

OTHER PUBLICATIONS

Edwards, "Handling and Physical Properties of Hybrid Polyesters", 39th Conf., Reinforced Plastics/Comp Inst, 1-84.
USSN 07/616,212, Sheet Molding Cmpds Having Improved Viscosity: Bogner; filed Nov. 20, 1990.
USSN 07/677,632; Flame Retardant Polyester-PU Hybrid Resin Comps.; Sinclair; filed Mar. 28, 1991.
USSN 07/575,069; Polyester-PU Hybrid Resin Molding Comps,; Brooks; filed Aug. 30, 1990.
USSN 07/913,301; Polyester-Polyurethane Hybrid Resins Composition . . . ; Heise et al; filed Jul. 14, 1992.
USSN 07/913,300; Surface Appearance and Processing Characteristics . . . ; Heise; filed Jul. 14, 1992.
USSN 07/913,302; Polyester-PU Hybrid Resins Containing . . . ; Heise et al.; filed Jul. 14, 1992.

*Primary Examiner*—James J. Seidleck
*Assistant Examiner*—Mary Critharis
*Attorney, Agent, or Firm*—Whyte Hirschboeck Dudek

[57] ABSTRACT

Polyester-polyurethane hybrid resin molding compositions having low levels of unsaturation which are modified by the addition of a low profile additive to provide glass-reinforced articles that have improved surface profiles and improved processability compared to commercial low profile-modified unsaturated (non-hybrid) polyester resins.

8 Claims, No Drawings

POLYESTER-POLYURETHANE HYBRID RESIN SYSTEMS CONTAINING LOW LEVELS OF UNSATURATION HAVING IMPROVED LOW PROFILING BEHAVIOR

This invention relates to polyester hybrid resin molding compositions. More particularly, this invention relates to polyester-polyurethane hybrid resin molding compositions having low levels of unsaturation which are modified by the addition of a low profile additive to provide glass-reinforced articles that have improved surface profiles and improved processability compared to commercial low profile-modified unsaturated (non-hybrid) polyester resins.

BACKGROUND OF THE INVENTION

Polyester-polyurethane hybrid resins are well-known in the art of thermoset molding compositions. The term hybrid describes a single, new type of polymer that is formed by the incorporation of the chemical groups and the properties of two different polymers, namely polyurethanes and unsaturated polyesters. Hybrid resins build molecular weight and toughness as they cure through the urethane chain-extension reaction, which occurs between the hydroxyl end groups on the polyester polyol and the isocyanate groups. Crosslinking occurs between the unsaturation in the polyester backbone and the styrene monomer, adding stiffness and thermal resistance. Thus, a unique blend of properties is obtained that cannot be acheived with either type of polymer alone. The hybrid resins are normally tougher than non-hybrid polyesters and stronger, stiffer and less expensive than polyurethanes. Polyester-polyurethane hybrid resins typically comprise a hydroxyl-terminated unsaturated polyester polyol, an ethylenically unsaturated monomer, such as styrene, and a polyisocyanate. Polyester-polyurethane hybrid resins can be easily adapted to many common thermoset molding techniques employed in both the polyurethane and unsaturated polyester industries. Such hybrid resins are generally supplied as a two component system having an A-side and a B-side. The A-side typically contains the polyisocyanate and a free radical initiator, while the B-side typically contains the hydroxyl-terminated unsaturated polyester polyol/styrene solution and, optionally, fillers and/or additives.

One key problem that occurs during the hybrid cure is resin shrinkage which results in dimensional stability problems, such as warpage. Unacceptable surface appearances such as waviness or roughness result when hybrids are reinforced with fibers, such as glass. The resin shrinks around the glass fibers, allowing the fibers to show through to the surface of the molded article. This phenomenon is commonly termed glass print-through. It is desirable to reduce the shrinkage and improve the surface appearance (profile) of molded articles manufactured from hybrid resins.

U.S. Pat. No. 4,822,849, teaches reducing the shrinkage of hybrid resins by reducing both the styrene level and unsaturation level with the hybrid. Lower shrinkage is achieved by reducing the crosslink density, but this may lead to reduced thermal properties of the hybrid resin. U.S. Pat. No. 4,280,979, describes the preparation of unsaturated polyester polyols, which can be reacted with a polyisocyanate and a polymerizable ethylenically unsaturated monomer to produce polyurethane/vinyl copolymers. Both patents are incorporated herein by reference.

Low profile additives (LPA's) are added to unsaturated polyester resins to control shrinkage and improve dimensional stability and surface smoothness (profile). The LPA tends to phase separate from the polyester during cure, resulting in thermoplastic domains that induce stresses within the system. These stresses lead to the formation of internal imperfections, such as microcracks and microvoids, in molded products containing the LPA. The internal imperfections are beneficial because they reduce the amount of shrinkage that occurs during cure. Typical LPA-modified polyesters may contain up to 60 weight percent styrene monomer, and typically have high levels of unsaturation (greater than 5.5 moles unsaturation per kilogram of polyol). When there is more than one mole of styrene per equivalent of unsaturation in the polyester, the product tends to have high shrinkages; however, this shrinkage is counterbalanced by the micro-imperfections developed during the phase separation of the thermoplastic from the thermoset.

Severe glass print-through occurs in the typical conventional composite hybrid molding compositions. The failure of conventional LPA technology in commercial hybrid resins has been attributed to several factors. First, low levels of unsaturation in the polyester contribute to slow reactivity of the hybrid system: fast reactivity is considered to be one of the keys to achieving effective low profiling behavior. Also, the polyurethane reaction is considered to be slower than the unsaturated polyester crosslinking reaction; consequently, hybrid reactivity was always assumed to be significantly less than that for the corresponding polyester system. Second, the hybrid resin has a high matrix toughness compared to the unsaturated (non-hybrid) polyester resins because of the polyurethane component; therefore, the hybrid resin will not form microcracks or craze as easily. This cracking is essential for reducing shrinkage in a low profile system. And third, the low profile additive is highly soluble in the isocyanate component and, thus, is less likely to phase separate and low profile during the cure. To date, there have been no reports of observing effective low profiling behavior in hybrid resins.

Typical commercial hybrids possess low levels of unsaturation in the polyester (less than 4.0 moles/Kg) which typically results in slow reactivity. High levels of unsaturation and fast reactivity are generally believed to be necessary for achieving effective phase separation of the low profile additive. The unsaturation level in a polyol can be increased by substituting an unsaturated anhydride or acid for the saturated anhydride or acid in the polyol preparation. The reactivity of the polyol can be further increased by increasing the concentration of the fumarate (trans) isomer of unsaturation compared to the maleate (cis) isomer. This can be accomplished during the polyol preparation by catalyzing the isomerization with morpholine, starting with fumaric acid, or altering the addition procedures to take advantage of the equilibrium favorability of the fumarate isomer. However, it has been found that not all polyols with high levels of fumarate unsaturation are soluble at the styrene levels typically used in hybrid resins.

Although high unsaturation generally leads to faster reactivity, it can have a detrimental effect on physical properties, resulting in hybrids with reduced impact resistance and lower elongation properties. High unsaturation also leads to higher shrinkage during cure. The polyol compositions of the present invention have high fumarate levels but reduced levels of unsaturation, leading to good styrene solubility and improved hybrid physical properties. Unsaturation is reduced through the incorporation of saturated dicarboxylic acids into the polyol backbone. These systems unexpectedly exhibit effective low profile behavior, that was previously thought to be impossible at these low unsaturation levels since the reactivity would be too slow to induce phase separation of the low profile additive. However, the high fumarate content at the lower unsaturation level results in a polymer with sufficiently high reactivity to induce low profile behavior.

SUMMARY OF THE INVENTION

Briefly, the polyester-polyurethane molding compositions of the present invention are molded products formed by the reaction of an A-side composition and a B-side composition. The polyester-polyurethane hybrid resin molding composition of the present invention is formed by contacting:

(A) an A-side composition comprising a polyfunctional isocyanate compound and a free radical polymerization catalyst with,
(B) a B-side composition wherein the B-side composition comprises: an ethylenically unsaturated monomer solution having dissolved therein from about 40 wt. % to about 90 wt. % based on total B-side, of a substantially water-free, unsaturated polyester polyol which is the reaction product of:
  (1) an unsaturated diacid selected from the group consisting of dicarboxylic acid, dianhydride, anhydride, and derivatives thereof, and
  (2) a saturated diacid selected from the group consisting of dicarboxylic acid, dianhydride, anhydride, and derivatives thereof, in amounts such that the level of unsaturation is from about 2.5 to about 4 moles/Kg polyol, preferably from about 3 to about 4 moles/Kg, at fumarate levels of greater than 95%, and
  (C) a diol composition which is present in a molar excess to achieve a polyol equivalent weight ranging from about 250 to about 1000 and
said polyester-polyurethane hybrid resin molding composition further comprising a low profile additive and further wherein the polyol resin composition has an acid number less than five.

The polyols in this invention have an acid number less than five, and preferably less than two. Furthermore, the polyols used in this invention have equivalent weights of between 250 and 1000, and preferably between about 250 and about 500. Low equivalent weight polyols are lower in viscosity and offer processing advantages. Also, more hybrid character is introduced into the polymer backbone through the formation of urethane linkages when a lower equivalent weight polyol is used; this will improve the overall matrix toughness. The B-side composition can be supplied separately and is useful for the preparation of the molding compositions of the present invention.

The polyester-polyurethane molding compositions of the invention can be processed into molded products formed by the reaction of an A-side composition and a B-side composition. The process for making improved surface polyester-polyurethane resin articles comprises reacting:

(A) an A-side composition comprising a polyfunctional isocyanate compound and a free radical polymerization catalyst with,
(B) a B-side composition wherein the B-side composition comprises: an ethylenically unsaturated monomer solution having dissolved therein from about 40 wt. % to about 90 wt. % based on total B-side, of a substantially water-free, unsaturated polyester polyol which is the reaction product of:
  (1) an unsaturated diacid selected from the group consisting of dicarboxylic acid, dianhydride, anhydride, and derivatives thereof, and
  (2) a saturated diacid selected from the group consisting of dicarboxylic acid, dianhydride, anhydride, and derivatives thereof, in amounts such that the level of unsaturation is from about 2.5 to about 4 moles/Kg polyol, preferably from about 3 to about 4 moles/Kg, at fumarate levels of greater than 95%, and
  (3) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five.

The invention further comprises a polyester-polyurethane hybrid resin molding system which is provided as an A-side composition and a B-side composition, as defined above. The end user of the system reacts the A and B-side compositions at the time of molding to obtain molding compositions and molded articles.

DETAILED DESCRIPTION OF THE INVENTION

For the purpose of this disclosure, the term "cure" or "curing" means the transformation of the hybrid resin system from a liquid to a gel or solid state. This curing occurs at the time of molding through the reaction of the isocyanate with active hydrogen-containing compounds. Further, the curing of the hybrid resin system occurs via the vinyl addition reaction between the ethylenically unsaturated monomer and the unsaturated polyester polyol. Depending on the catalyst and catalyst levels employed, curing can optimally occur at the time of molding at temperatures of about 25° C. to about 150° C. for a time of 30 seconds to about 24 hours.

As used herein, the term "stoichiometric index" refers to the value obtained by dividing the number of active NCO groups of the isocyanate compound by the number of OH groups in the polyester polyol of the invention.

The term "substantially water-free", as used herein, means a water content of less than 1 percent, preferably less than 0.2 percent and most preferably less than 0.05 percent.

The term "polyfunctional", as used herein, is intended to include functionalities of two or greater.

The ethylenically unsaturated monomer used in the composition of the invention can be any ethylenically unsaturated monomer capable of cross-linking the unsaturated polyester polyol via vinyl addition polymerization. Examples of useful ethylenically unsaturated monomers are styrene, o-, m-, and p-methyl styrene, methyl acrylate, methyl methacrylate, t-butylstyrene, divinyl benzene, diallyl phthalate, triallyl cyanurate, and mixtures thereof. The preferred monomer is styrene because it provides an economical monomer solution.

The unsaturated polyester polyol in the present invention has at least one dicarboxylic alkene moiety and is preferably an oligomer of an alpha, betaethylenically unsaturated dicarboxylic acid compound obtained by the condensation reaction of one or more of (1) a saturated di- or polycarboxylic acid or anhydride (examples of suitable saturated acids or anhydrides include phthalic acid or anhydride, isophthalic acid, terephthalic acid, adipic acid, glutaric acid, succinic acid or anhydride, and the like); (2) an unsaturated di- or polycarboxylic acid or anhydride (suitable α, β-unsaturated dicarboxylic acids or anhydrides include maleic acid or anhydride, fumaric acid, itaconic acid, and other α, β-unsaturated diacids, and the like); and (3) a diol or composition of diols (suitable diols include neopently glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol, 2-methyl-1,3-propanediol, and the like).

One of the proposed reasons that commercial hybrid resins have not been successfully low-profiled has been attributed to the low reactivity of the unsaturated polyester portion of the hybrid resin. One method to increase the reactivity is to increase the unsaturation in the polyol to high levels (greater than 4.0 moles/kg). This will increase the shrinkage and lower the overall toughness of the molded product. The present invention increases the reactivity of the hybrid resin through the use of polyester polyols having higher levels of the fumarate isomer while still keeping the level of unsaturation relatively low (less than 4.0 mole/kg). The lower levels of unsaturation are achieved by substituting saturated diacids and dianhydrides for the corresponding unsaturated diacids and dianhydrides. High fumarate levels of greater than 95% can be achieved by one of three methods: (1) catalyzing the isomerization with morpholine, (2) starting with fumaric acid, or (3) altering the addition procedures to take advantage of the equilibrium favorability of the fumarate isomer. The result is a hybrid system that contains a low level of unsaturation but can still be effectively low profiled.

The isocyanate compound, typically referred to as a polyisocyanate, must have at least two functional groups and be capable of reacting with the polyester polyol. Examples of suitable isocyanate compounds include 2,4-and 2,6-toluene diisocyanate (TDI), 4,4'-diphenylmethylene diisocyanate (MDI), polymethylene polyphenyl isocyanate (PMPPI), dianisidine diisocyanate, metaphenylene diisocyanate, isophrone diisocyanate, hexamethylene diisocyanate, and mixtures thereof. The preferred isocyanates are liquified MDI's or PMPPI's because of their low viscosity, ease of handling, and relative low cost.

The ratio of active isocyanate groups to active hydroxyl groups in the polyester polyol can range from about 0:1.5 to about 1:1 with the preferred ratio being about 1:1, which is a stoichiometrically balanced system. The NCO/OH balanced system promotes complete reactivity while maximizing the polyurethane or hybrid characteristics of the molding system.

The polyester polyol must be substantially water free. Removal of water is important for two reasons. First, the removal of water is necessary to obtain the desirable molecular weight of the polyester polyol. Second, the presence of water in the hybrid resins of the invention will cause undesirable foaming.

The polyols used in this invention have an acid number less than five, and preferably less than about two. Acid number is an indication of the amount of residual carboxylic acid in the polyester polyol. Carboxylic acids can react with the isocyanates during the urethane reaction, forming carbon dioxide, which results in undesirable foaming. Further, the polyols used in this invention have equivalent weights of between about 250 and about 1000, and preferably between about 250 and about 500. This range is desirable to insure lower viscosity and the optimal hybrid character in the cured hybrid polymer.

The free radical polymerization catalysts useful in producing the molding compositions of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiarybutyl peroxybenzoate (TBPB), 2,2'-azo-bis-isobutyronitrile, lauryl peroxide, di-tertiarybutylperoxide, diisopropyl peroxide carbonate and tertiarybutyl-peroxy-2-ethylhexanoate, and the like. These catalysts are typically added at levels ranging from about 0.5 to about 10.0 parts per hundred based on polyol resin (pphr).

Promoters can also be used in combination with vinyl polymerization peroxide catalysts to control the rate of free radical initiation. Suitable benzoyl peroxide promoters include N,N-diethylaniline, N,N-dimethyl paratoluidine, and other tertiary aromatic amines, and the like.

Catalysts that are useful in catalyzing the polyurethane formation (polyurethane catalysts) in producing the hybrid polymer in accordance with this invention include (a) tertiary amines such as N, N-dimethylcyclohexylamine, (b) tertiary phosphines such as trialkylphosphines, (c) strong bases such as alkali and alkaline earth metal hydroxides, alkoxides, and phenoxides, (d) acidic metal salts of strong acids such as ferric chloride, (e) organotin compounds such as dibutytin dilaurate, and (f) cyclic amines such as 1,5-diazabicyclo(5.4.0)undec-5-ene. Other commonly used catalysts for making poluyurethanes can be found in U.S. Pat. Nos. 4,280,979 and 4,598,103, incorporated herein by reference.

Suitable low profile additives (LPA's) are thermoplastic polymers such as, for example, vinyl acetate polymer, acrylic polymer, polyurethane polymer, polystyrene, butadiene styrene copolymer, saturated polyester, polycaprolactone, and the like. These polymers typically have non-reactive end groups, are of high molecular weights (10,000 to 200,000) and are typically supplied in a vinyl monomer such as styrene to reduce the viscosity of the thermoplastic to a workable range.

The LPA solution can be incorporated into the A-side (isocyanate) or B-side (polyol). Incorporation into the A-side is preferred because it has been found to have better storage stability. This is an advantage of the hybrid system compared with non-hybrid unsaturated polyester polyols. Typical LPA weight loadings are from about 1 wt. % to about 40 wt. % based on the weight of polyol, preferably from about 5 wt. % to about 20 wt. %.

The hybrid resins of the invention can be fabricated using liquid reactive molding or compression molding techniques commonly employed in the unsaturated polyester and polyurethane industries. Liquid molding is the direct injecting or pouring of a hybrid resin into a mold (closed molding) or onto a mold (open molding). In liquid injection closed molding, the polyisocyanate and hydroxy-terminated polyester in the monomer solution (polyol) are fed separately into the chamber of a mixing head where the two components are mixed. Upon mixing, the hybrid reaction begins instantaneously whereby the rate of reactivity is dependent on the catalyst and temeprature used. The hybrid liquid stream is injected between mold halves wherein the reactions between the various components of the hybrid resin system continue. After sufficient time for cure, the part is removed from the mold. The part can be used as molded or be further post-annealed in an oven. Common liquid closed molding techniques which are well known in the art include resin transfer molding (RTM), reaction injection molding (RIM) and structural reaction injection molding (S-RIM).

By adjusting the stoichiometry and/or the use of urethane and polyester catalysts, the gel time of the in situ hybrid can be adjusted from about 30 seconds to about 20 minutes. The gel time will dictate the time required between mixing the two components and injecting the resinous material into the mold.

Various organic or inorganic fibers or fillers can be added to improve the reinforcing properties of the hybrid and/or reduce its cost. Such organic fibers include polyacrylonitrile fibers (PAN), pitch-based carbon fibers, aromatic polyamide fibers, liquid crystal polyester fibers, or any polymeric fiber that improves the properties of the hybrid.

Inorganic fibers include glass and whiskers, while inorganic fillers include such materials as talc, calcium carbonate, silica beads, calcium sulfate, aluminum trihydrate, ammonium polyphosphate, and the like. While the amounts of filler will vary depending on the application, typical additions can range from about 0 to about 200 parts filler based on 100 parts of the hybrid system of the invention. Typically, inorganic fibers are added to improve the reinforcing properties; they can be added in amounts varying from about 0 to about 50 wt. % based on total polyester-polyurethane hybrid resin system.

In summary, the preferred molding compositions comprise an A-side and a B-side wherein the A-side composition comprises the polyfunctional isocyanate compound and a free radical polymerization catalyst and optionally, the LPA. The ratio of active isocyanate groups to active hydroxyl groups in the polyester polyol can range from about 0:1.5 to about 1:1 with the preferred ratio being about 1:1, which is a stoichiometrically balanced system. The NCO/OH balanced system promotes complete reactivity while maximizing the polyurethane or hybrid characteristics of the molding system. The free radical polymerization catalysts can be peroxides, persulfides, perborates, percarbonates, and azo compounds or any other suitable material capable of catalyzing the vinyl polymerization between the unsaturation in the polyester polyol and the ethylenically unsaturated monomer. These catalysts are typically added at levels ranging from about 0.5 to about 10.0 parts per hundred based on polyol resin (pphr).

The B-side composition comprises a mixture of
(1) an ethylenically unsaturated monomer solution having dissolved therein from about 40 wt. % to about 90 wt. % based on total B-side, of a substantially water-free, unsaturated polyester polyol which is the reaction product of:

(a) an unsaturated dicarboxylic acid, dianhydride, anhydride, or derivative thereof, and
(b) a saturated dicarboxylic acid, dianhydride, anhydride, or derivative thereof, in amounts such that the level of unsaturation is between 2.5 and 4 moles/Kg polyol, preferably between 3 and 4 moles/Kg, at fumarate levels of greater than 95%, and
(c) a diol composition which is present in a molar excess to achieve a polyol equivalent weight ranging from about 250 to about 1000, and
said polyester-polyurethane hybrid resin molding composition further comprising a low profile additive and further wherein the polyol resin composition has an acid number less than five,
(2) a low profile additive is added that can range from about 1 wt % to about 40 wt %, and optionally
(3) various inhibitors, promoters and catalysts which control the processability (gel time) and rate of cure.

The present invention is further illustrated by the following examples which are not, however, to be construed as limitations thereof.

EXAMPLES

Preparation of Unsaturated Polyester Polyols

Unsaturated polyester polyols which were used to prepare the hybrid resin molding compositions of the invention were prepared as follows:

Unsaturated polyester polyols were prepared by charging the reactants in Table I into a standard four-liter, four-neck reaction kettle equipped with a mechanical stirrer, thermometer, a partial condenser comprising a glass column packed with Raschig rings, a total condenser and receiver. This apparatus was mounted in an electric heating mantle with a temperature control device. For each run the entire reaction was carried out under an inert nitrogen atmosphere in which the nitrogen was passed through a rotameter and into the reaction medium near the mechanical stirrer. The reactants were heated slowly until the mixture could be agitated. The reactants were further heated until an overhead temperature of about 98°-100° C. was maintained. The reaction temperature at which water was liberated was about 150° C. Water was continuously removed from the reaction medium through the condenser system. The resin was heated to about 232° C. and held until the acid number was reduced to two or less, but more preferably, one or less.

The resin was cooled to 120° C., hydroquinone was added to the polyol, and the inhibited polyol was added to cool styrene monomer inhibited with 1,4-napthaquinone and p-benzoquinone. The resulting polyols are approximately 80% non-volatile material (NVM). Typical liquid properties of polyols are reported in Table II. Typical water content of the polyester polyols used in the invention was less than 1 wt. % based on total B-side and preferably less than 0.2 wt. % and most preferably less than 0.05 wt. %. The removal of water was important for two reasons. First, the removal of water was necessary to obtain the desirable molecular weight of the polyester polyol. Second, the presence of water in the hybrid resins of the invention can cause undesirable foaming.

Typical molecular weights of the polyester polyols (on a solid basis) useful in the instant invention are from about 500 g/mole to about 2000 g/mole, and preferably between about 500 g/mole and about 1000 g/mole. If the polyol was difunctional, the equivalent weight of the polyol was half the molecular weight, while polyfunctional polyols would have equivalent weights equal to the molecular weight divided by the OH functionality of the polyol.

TABLE I

Polyester Polyol Formulations

| | Comparative Polyol A | Polyol 1 | Polyol 2 | Comparative Polyol B |
|---|---|---|---|---|
| REACTANTS | | | | |
| Fumaric Acid, moles | 1.00 | 0.67 | 0.67 | — |
| Maleic Anhydride, moles | — | — | — | 0.67 |
| Isophthalic Acid, moles | — | 0.33 | 0.33 | 0.33 |
| Ethylene Glycol, moles | 0.66 | 0.66 | 0.66 | 0.66 |
| 2-Methyl-1,3-Propanediol, moles | 0.66 | 0.66 | — | — |
| Neopentyl Glycol, moles | — | — | 0.66 | 0.66 |
| Di-n-butyl Tin Maleate, ppm | 250 | 250 | 250 | 250 |
| INHIBITORS | | | | |
| Hydroquinone, ppm | 150 | 150 | 150 | 150 |
| 1,4-Naphthoquinone, ppm | 75 | 75 | 75 | 75 |
| p-Benzoquinone, ppm | 100 | 100 | 100 | 100 |

TABLE II

Typical Liquid Resin Properties of Polyols

| | Comparative Polyol A | Polyol 1 | Polyol 2 | Comparative Polyol B |
|---|---|---|---|---|
| Reactants Degree of unsaturation (mol/kg) | 5.5 | 3.4 | 3.2 | 3.2 |
| Fumarate Content (%) | >95 | >95 | >95 | 80 |
| Acid Number, solid basis (mg KOH/g) | 0.7 | 1.0 | 0.9 | 0.6 |
| OH Number, solid basis (mg KOH/g) | 171 | 165 | 111 | 136 |

*The degree of unsaturation was calculated by dividing the weight of the polyester into the moles of maleic anhydride. The data was normalized to 1000 g of polyol. The acid number and the OH number were determined by titration where as the fumarate content was determined by proton NMR.

COMPARATIVE EXAMPLE A

Preparation of Polyol A

This example outlines the preparation of a polyol that contains a high level of unsaturation and a high fumarate content.

Following the procedure described in the section on polyol preparation, an unsaturated polyester polyol was synthesized from the following starting materials: fumaric acid (1.00 mole), ethylene glycol (0.66 moles), and 2-methyl-1,3-propanediol (0.66 moles). The resulting polyol contained 5.5 moles of unsaturation per Kg of polyol, had an acid number (solids basis) of 0.7 mg KOH/g, a hydroxyl number (solids basis) of 171 mg KOH/g. The polyol had a high (greater than 95%) fumarate content and was soluble in styrene at a level of 80% solids.

EXAMPLE 1

Preparation of Polyol 1

This example outlines the preparation of a polyol that contains a low level of unsaturation and a high fumarate content.

Following the procedure described in the section on polyol preparation, an unsaturated polyester polyol was synthesized from the following starting materials: fumaric acid (0.67 moles), isophthalic acid (0.33 mole), ethylene glycol (0.66 moles), and 2-methyl-1,3-propanediol (0.66 moles). The resulting polyol contained 3.4 moles of unsaturation per Kg of polyol, had an acid number (solids basis) of 1.0 mg KOH/g, a hydroxyl number (solids basis) of 165 mg KOH/g. The polyol had a high (greater than 95%) fumarate content and was soluble in styrene at a level of 80% solids.

EXAMPLE 2

Preparation of Polyol 2

This example outlines the preparation of a polyol that contains a low level of unsaturation and a high fumarate content.

Following the procedure described in the section on polyol preparation, an unsaturated polyester polyol was synthesized from the following starting materials: fumaric acid (0.67 mole), isophthalic acid (0.33 moles), ethylene glycol (0.66 moles), and neopentyl glycol (0.66 moles). The resulting polyol contained 3.2 moles of unsaturation per Kg of polyol, had an acid number (solids basis) of 0.9 mg KOH/g, a hydroxyl number (solids basis) of 111 mg KOH/g. The polyol had a high (greater than 95%) fumarate content and was soluble in styrene at a level of 80% solids.

COMPARATIVE EXAMPLE B

Preparation of Polyol B

This example outlines the preparation of a polyol that contains a low level of unsaturation and a relatively low fumarate content.

Following the procedure described in the section on polyol preparation, an unsaturated polyester polyol was synthesized from the following starting materials: maleic anhydride (0.67 mole/), isophthalic acid (0.33 mole), ethylene glycol (0.66 moles), and neopentyl glycol (0.66 moles). The resulting polyol contained 3.2 moles of unsaturation per Kg of polyol, had an acid number (solids basis) of 0.6 mg KOH/g, a hydroxyl number (solids basis) of 136 mg KOH/g. The polyol had a relatively low (approximately 80%) fumarate content and was soluble in styrene at a level of 80% solids.

COMPARATIVE EXAMPLE C

Polyol A-Hybrid Resin Molding Composition

The B-side was prepared using Polyol A described in Comparative Example A. To 36.13 g of polyol was added a total of 36.12 g styrene monomer to achieve the target nonvolatile polyol solids content (NVM) of approximately 50%. N,N-diethylaniline (0.43 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 8.67 g of LPA (solids basis) was added to the polyol. The LPA added as a 40 wt % solution in styrene; the styrene was adjusted to achieve the target NVM for the polyol. A urethane catalyst (0.29 g) was also added to the B-side. This catalyst is a heat-activated, delayed-action co-catalyst based on 1,5-diazabicyclo(5.4.0)undec-7-ene was used. This catalyst is available from Air Products and Chemicals, Inc. under the tradename POLY-CAT® SA-102. After mixing the B-side, the sample was allowed to dearate for 10 minutes.

The A-side was prepared by adding benzoyl peroxide (1.45 g) to PAPI 2027 isocyanate component (15.44 g), available from Dow Chemical. PAPI 2027 is a polymethylene polyphenylisocyanate (PMPPI). PAPI 2027 is characterized as having an NCO functionality of 2.7, an isocyanate equivalent weight of 134.0 g/equivalent of NCO, a viscosity at 25° C. of 180 cps, and a density at 25° C. of 1.23 g/ml. These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

EXAMPLE 3

Polyol 1-Hybrid Resin Molding Composition

The B-side was prepared using Polyol 1 described in Example 1. To 36.56 g of polyol was added a total of 36.56 g styrene monomer to achieve the target nonvolatile polyol solids content (NVM) of approximately 50%. N,N-diethylaniline (0.88 g) was mixed into the polyol to promote the polyester reaction and p-benzoquinone (0.01 g) was added to delay the initiation of the free radical reaction. The low profile additive was polyvinyl acetate which had a weight-average molecular weight of 80,000 to 100,000: 10.97 g of LPA (solids basis) was added to the polyol. The LPA was added as a 40 wt % solution in styrene; this styrene was adjusted to achieve the target NVM for the polyol. A urethane catalyst, POLYCAT® SA-102 (0.44 g) was also added to the B-side. After mixing the B-side, the sample was allowed to deaerate for 10 minutes.

The A-side was prepared by adding benzoyl peroxide (1.46 g) to PAPI 2027 isocyanate component (11.65 g). These weights insured that A-side and B-side would be combined stiochiometrically. The stiochiometric amount was obtained by adding an equal mole equivalent of the polyisocyanate to an equal mole equivalent of polyol such that the ratio of NCO:OH was 1.0.

EXAMPLE 4

Polyol 2-Hybrid Resin Molding Composition

The B-side was prepared using Polyol 2 described in Example 2. To 34.41 g of polyol was added a total of 35.09 g styrene monomer to achieve the target nonvolatile polyol solids content (NVM) of approximately 50%. N,N-diethylaniline (0.61 g) was mixed into the polyol to promote the polyester reaction and p-benzoquinone (0.02 g) was added to delay the initiation of the free radical reaction. The low profile additive was polyvinyl acetate which had a weight-average molecular weight of 80,000 to 100,000: 8.82 g of LPA (solid basis) was added to the polyol. The LPA was added as a 40 wt % solution in styrene; this styrene was adjusted to achieve the target NVM for the polyol. A urethane catalyst, POLYCAT® SA-102 (0.41 g) was also added to the B-side. After mixing the B-side, the sample was allowed to deaerate for 10 minutes.

The A-side was prepared by adding benzoyl peroxide (2.03 g) to Papi 2027 isocyanate component (12.17 g). These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

COMPARATIVE EXAMPLE D

Polyol B-Hybrid Resin Molding Composition

The B-side was prepared using Polyol B described in Comparative Example B. To 35.49 g of polyol was added a total of 35.10 g styrene monomer to achieve the target nonvolatile polyol solids content (NVM) of approximately 50%. N,N-diethylaniline (0.63 g) was mixed into the polyol to promote the polyester reaction and p-benzoquinone (0.02 g) was added to delay the initiation of the free radical reaction. The low profile additive was polyvinyl acetate which had a weight-average molecular weight of 80,000 to 100,000: 13.64 g of LPA (solids basis) was added to the polyol. The LPA was added as a 40 wt % solution in styrene; this styrene to achieve the target NVM for the polyol. A urethane catalyst, POLYCAT® SA-102 (0.42 g) was also added to the B-side. After mixing the B-side, the sample was allowed to deaerate for 10 minutes.

The A-side was prepared by adding benzoyl peroxide (2.10 g) to Papi 2027 isocyanate component (11.51 g). These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

EXAMPLES 5

LOW PROFILING BEHAVIOR UNDER MOLDING CONDITIONS

Molding experiments were conducted on a laboratory resin transfer molding (RTM) tool which used an pneumatic cartridge injection system. The mold cavity was $12 \times 12 \times 0.125$ inch with an aluminum top and a hardened steel bottom surface. The bottom surface was diamond-polished and chromeplated; the surface roughness was approximately six microinches ($\mu''$) as measured by a profilometer. With this tool, the surface quality potential of each resin could be accurately determined under actual processing conditions. These experiments were conducted on glass-reinforced systems. One ply of glass surfacing veil was placed on the appearance or bottom surface of the mold and two plies of Certainteed 816 continuous strand glass mat were placed on top of the veil; this arrangement yielded glass contents ranging from about 15 wt. % to about 20 wt. %. The molding system was equipped with two external water heating units; therefore, the mold halves could be maintained at isothermal conditions. Before closing the mold, a thin wire thermocouple was placed between the two random strand glass mats approximately three inches from the mold edges.

The A and B-sides were prepared separately and allowed to de-aerate. The liquids from sides A and B were premixed for approximately 1.5 minutes prior to being shot into the mold. The resin was injected at 30 psig with a hold pressure of 3 to 10 psig. The demold time ranged from 10 to 15 minutes. The thermocouple was used to tracking the resin cure. T-max was defined as the maximum temperature reached by the resin during molding: T-rise was the slope of the temperature profile during the curing process and was related to the rate of cure, and t-max was the time after injection that T-max was reached. The hybrid compositions described in Comparative Examples C and D and Examples 3 and 4 were molded under the conditions outlined above. The results are reported in Table III.

TABLE III

| | Reactivity and Surface Comparison | | | |
|---|---|---|---|---|
| | Comparative Example C | Example 3 | Example 4 | Comparative Example D |
| Mold Temperature (°F.) | 155 | 155 | 155 | 155 |
| Reactivity | | | | |
| t-max (sec) | 86 | 62 | 88 | 121 |
| T-max (°F.) | 298 | 256 | 220 | 209 |
| T-rise (°F./min) | 425 | 270 | 135 | 75 |
| Surface Appearance | | | | |
| Opaqueness | opaque | opaque | opaque | translucent |
| Color | white | white | white | amber |

Comparative hybrid system Example C is based on a high fumarate polyol which had a high level of unsaturation; consequently, the cure rate (T-rise) was 150 to 300% greater than for the Example hybrid systems 3 and 4 which possessed high fumarate contents but 40% less unsaturation. High reactivity resulting from a high levels of unsaturation was generally though to be a requirement for achieving effective low profiling behavior. High levels of unsaturation lead to high shrinkages during cure as well as poor impact and elongation properties. The unsaturation level in the polyols in Examples 3 and 4 was reduced by using saturated acids or anhydrides while still obtaining high fumarate contents. Both Examples 3 and 4 exhibited complete and homogeneous white-out despite the lower reactivity and unsaturation levels; the panels were white and opaque and resembled the panels produced from Comparative Example C. It is unexpected to find low profiling behavior in hybrid resins possessing unsaturation levels of less than 4.0 moles/kg.

The high fumarate content was critical for obtaining the low profiling effect. The polyol in Comparative Example D had an unsaturation level equivalent to the polyols in Examples 3 and 4; however, Comparative Example D did not white-out and was translucent. The polyol in Comparative Example D had a fumarate content of only 80%; this led to a significant decrease in reactivity. This example shows that high fumarate hybrids with low levels of unsaturation can be low profiled.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

That which is claimed is:

1. A polyester-polyurethane hybrid resin molding composition of the present invention formed by contacting:

(A) an A-side composition comprising a polyfunctional isocyanate compound and a free radical polymerization catalyst with, (B) a B-side composition wherein the B-side composition comprises: an ethylenically unsaturated monomer solution having dissolved therein from about 40 wt. % to about 90 wt. % based on total B-side, of a substantially water-free, unsaturated polyester polyol which is the reaction product of:

(1) an unsaturated diacid selected from the group consisting of dicarboxylic acid, dianhydride, anhydride, and derivatives thereof, and (2) a saturated diacid selected from the group consisting of dicarboxylic acid, dianhydride, anhydride, and derivatives thereof, in amounts such that the level of unsaturation is from about 2.5 to about 4 moles/kg polyol wherein the fumarate levels are greater than 95%, and (c) a diol composition which is present in a molar excess to achieve a polyol equivalent weight ranging from about 250 to about 1000 and said polyester-polyurethane hybrid resin molding composition further comprising a low profile additive and further wherein the polyol resin composition has an acid number less than five.

2. A process for making polyester-polyurethane resin molding compositions comprising reacting:

(A) an A-side composition comprising a polyfunctional isocyanate compound and a free radical polymerization catalyst with, (B) a B-side composition wherein the B-side composition comprises: an ethylenically unsaturated monomer solution having dissolved therein from about 40 wt. % to about 90 wt. % based on total B-side, of a substantially water-free, unsaturated polyester polyol which is the reaction product of:

(1) an unsaturated diacid selected from the group consisting of dicarboxylic acid, dianhydride, anhydride, and derivatives thereof, and (2) a saturated diacid selected from the group consisting of dicarboxylic acid, dianhydride, anhydride, and derivatives thereof, in amounts such that the level of unsaturation is from about 2.5 to about 4 moles/Kg polyol wherein the fumarate levels are greater than 95%, and (C) a diol composition which is present in a molar excess to achieve a polyol equivalent weight ranging from about 250 to about 1000 and said polyester-polyurethane hybrid resin molding composition further comprising a low profile additive and further wherein the polyol resin composition has an acid number less than five.

3. A polyester-polyurethane hybrid resin molding system comprising:

(A) an A-side composition comprising a polyfunctional isocyanate compound and a free radical polymerization catalyst with, (B) a B-side composition wherein the B-side composition comprises: an ethylenically unsaturated monomer solution having dissolved therein from about 40 wt. % to about 90 wt. % based on total B-side, of a substantially water-free, unsaturated polyester polyol which is the reaction product of:

(1) an unsaturated diacid selected from the group consisting of dicarboxylic acid, dianhydride, anhydride, and derivatives thereof, and (2) a saturated diacid selected from the group consisting of dicarboxylic acid, dianhydride, anhydride, and derivatives thereof, in amounts such that the level of unsaturation is from about 2.5 to about 4 moles/Kg polyol wherein the fumarate levels are greater than 95%, and (C) a diol composition which is present in a molar excess to achieve a polyol equivalent weight ranging from about 250 to about 1000 and said polyester-polyurethane hybrid resin molding composition further comprising a low profile additive and further wherein the polyol resin composition has an acid number less than five.

4. The polyester-polyurethane hybrid resin molding composition of claim 1 further including fillers.

5. The polyester-polyurethane hybrid resin molding composition of claim 1 including additives in addition to the low profile additive.

6. The polyester-polyurethane hybrid resin molding composition of claim 1 wherein the saturated dicarboxylic acid, dianhydride, anhydride or derivative thereof is in amounts such that the level of unsaturation is from about 3 moles/Kg to about 4 moles/Kg.

7. The polyester-polyurethane hybrid resin molding composition of claim 1 wherein the low profile additive is added to the A-side composition.

8. A composition useful in the preparation of a polyester-polyurethane hybrid resin, the composition comprising an ethylenically unsaturated monomer solution having dissolved therein from about 40 weight percent to about 90 weight percent, based on the total weight of the composition, of a substantially water-free, unsaturated polyester polyol which is the reaction production of:

1. An unsaturated diacid selected from the group consisting of dicarboxylic acid, dianhydride, anhydride, and derivatives thereof, and 2. A saturated diacid selected from the group consisting of dicarboxylic acid, dianhydride, anhydride, and derivatives thereof, in amounts such that the level of unsaturation is from about 2.5 to about 4 moles/Kg polyol wherein the fumarate levels are greater than 95%, and 3. A diol composition which is present in a molar excess to achieve a polyol equivalent weight ranging from about 250 to about 1000.

* * * * *